(12) United States Patent
Ising et al.

(10) Patent No.: US 9,273,641 B2
(45) Date of Patent: Mar. 1, 2016

(54) GAS FLOW UNIT, A GAS TREATMENT DEVICE AND A COMBUSTION ENGINE PROVIDED THEREWITH

(75) Inventors: Magnus Ising, Lund (SE); Nader Najjar, Lund (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/423,894

(22) PCT Filed: Aug. 31, 2012

(86) PCT No.: PCT/EP2012/003657
§ 371 (c)(1),
(2), (4) Date: Feb. 25, 2015

(87) PCT Pub. No.: WO2014/032685
PCT Pub. Date: Mar. 6, 2014

(65) Prior Publication Data
US 2015/0204280 A1      Jul. 23, 2015

(51) Int. Cl.
*F01N 13/08* (2010.01)
*F02M 25/07* (2006.01)
(Continued)

(52) U.S. Cl.
CPC ......... *F02M 25/0726* (2013.01); *F01N 3/2892* (2013.01); *F01N 13/007* (2013.01);
(Continued)

(58) Field of Classification Search
CPC ... F01N 3/2892; F01N 13/00; F01N 2240/02; F01N 2240/20; F01N 2470/10; F01N 2470/14; F01N 2470/16; F01N 2470/18; F01N 2470/20; F01N 2490/10; F01N 2490/16; F01N 2490/18; F01N 2490/20

USPC ............................................ 60/278, 299, 324
See application file for complete search history.

(56) References Cited

U.S. PATENT DOCUMENTS

| 5,611,409 A * | 3/1997 | Arseneau .................. F01N 1/08 181/228 |
| 5,773,770 A * | 6/1998 | Jones ........................ F01N 1/02 181/239 |

(Continued)

FOREIGN PATENT DOCUMENTS

| DE | 2358732 A1 | 6/1975 |
| DE | 10250366 A1 | 7/2003 |

(Continued)

OTHER PUBLICATIONS

International Search Report (May 17, 2013) for corresponding International App. PCT/EP2012/003657.

*Primary Examiner* — Thomas Denion
*Assistant Examiner* — Jorge Leon, Jr.
(74) *Attorney, Agent, or Firm* — WRB-IP LLP (57) ABSTRACT

A gas flow unit includes a gas flow inlet, a gas flow outlet and a gas flow chamber configured to convey a gas flow from the inlet to the outlet, wherein the gas flow inlet is configured to convey the gas flow in a first direction into the gas flow chamber and wherein the gas flow outlet is configured to convey the gas flow in a second direction from the gas flow chamber, wherein the second direction is angular in relation to the first direction, and wherein the gas flow inlet is an inlet into the gas flow chamber and the gas flow outlet is an outlet from the gas flow chamber. In the first gas flow direction, the gas flow chamber extends beyond a projection of an outer periphery of the gas flow outlet and defines a prolongation configured for conveying a first part of the gas flow such that it enters the gas flow outlet from a different direction than a second part of the gas flow entering the gas flow outlet without passing through the prolongation.

38 Claims, 4 Drawing Sheets

(51) Int. Cl.
  *F16L 9/00*   (2006.01)
  *F01N 3/28*   (2006.01)
  *F01N 13/00*  (2010.01)

(52) U.S. Cl.
  CPC .......... *F01N 13/08* (2013.01); *F16L 9/00* (2013.01); *F01N 2240/02* (2013.01); *F01N 2240/20* (2013.01); *F01N 2470/00* (2013.01); *F01N 2470/06* (2013.01); *F01N 2470/10* (2013.01); *F01N 2470/14* (2013.01); *F01N 2470/16* (2013.01); *F01N 2470/18* (2013.01); *F01N 2470/20* (2013.01); *F01N 2490/10* (2013.01); *F01N 2490/16* (2013.01); *F01N 2490/18* (2013.01); *F01N 2490/20* (2013.01)

(56) References Cited

U.S. PATENT DOCUMENTS

| | | | | |
|---|---|---|---|---|
| 7,458,210 B2* | 12/2008 | Kikuchi | ............... | F01N 13/08 60/313 |
| 8,413,435 B2* | 4/2013 | Sloss | ............... | F01N 13/102 60/313 |
| 2003/0121252 A1* | 7/2003 | Huh | ............... | B01F 3/02 60/302 |
| 2006/0242952 A1* | 11/2006 | Muramatsu | ............... | F01N 1/003 60/299 |
| 2007/0000240 A1* | 1/2007 | Hirata | ............... | B01D 53/9431 60/286 |
| 2009/0013673 A1* | 1/2009 | Mukaida | ............... | F01N 1/089 60/299 |
| 2010/0056002 A1* | 3/2010 | Konakawa | ............... | F01N 3/10 440/89 H |
| 2010/0196219 A1* | 8/2010 | Endo | ............... | B01D 53/9431 422/168 |
| 2010/0242451 A1* | 9/2010 | Werni | ............... | F01N 3/0335 60/297 |
| 2014/0360170 A1* | 12/2014 | Hacklander | ............... | F01N 3/2066 60/286 |
| 2015/0061286 A1* | 3/2015 | Niaz | ............... | F01N 3/2892 285/332 |

FOREIGN PATENT DOCUMENTS

EP  2343440 A1  7/2011
JP  2007211663 A  8/2007

* cited by examiner

GAS FLOW UNIT, A GAS TREATMENT DEVICE AND A COMBUSTION ENGINE PROVIDED THEREWITH

BACKGROUND AND SUMMARY

The present invention relates to gas flow unit comprising a gas flow inlet, a gas flow outlet and a gas flow chamber configured to convey a gas flow from the inlet to the outlet, wherein the gas flow inlet is configured to convey the gas flow in a first direction into the gas flow chamber and wherein the gas flow outlet is configured to convey the gas flow in a second direction from the gas flow chamber, wherein the second direction is angular in relation to the first direction, and wherein the gas flow inlet is an inlet into the gas flow chamber and the gas flow outlet is an outlet from the gas flow chamber.

The present invention also relates to a gas treatment device comprising such a gas flow unit together with a gas treatment element provided downstream said gas flow unit.

Furthermore the invention relates to an internal combustion engine comprising a combustion chamber, from which exhaust gas is emitted, wherein said engine comprises a gas treatment device according to the invention for the treatment of either exhaust gas emitted from the combustion chamber or inlet air to said combustion chamber.

The background of the invention is related to design considerations with regard to exhaust gas recirculation coolers in internal combustion engines. However, it should be understood that the defined problem may be found also in other gas conducting systems and the solution thereto may thus also be applied in such systems.

Most gas/liquid coolers used in internal combustion engines need a significant distance upstream of their inlet on the gas side to distribute the gas flow uniformly over the cooler area. This is necessary to achieve high cooler effectiveness and ensure metal temperature below critical limits. One example of a cooler is the one used in the exhaust gas recirculation (EGR) circuit to increase the amount of EGR in modern diesel engines. EGR is used to reduce the combustion temperature in the cylinders and thereby reduce the NOx formation, which progresses faster at high temperatures.

In modern vehicles the available space in the engine compartment is limited due to more and more components used to fulfill stringent emission regulations, such as variable geometry turbo, crank case ventilation etc. This sometimes makes it very difficult to permit enough distance upstream the inlet of the cooler.

In a typical case, the exhaust gas flowing in a gas channel from the combustion chamber to a gas cooler in the EGR circuit has to undergo a substantial change of direction, in the range of 90°, shortly before entering the cooler. In order to achieve an optimum cooler efficiency it is important that the gas flow is uniformly distributed over the cross sectional area of the channel from which it is introduced into the cooler. If the distance between the region in which the direction of the gas is changed and the entrance to the cooler is very short, there will be difficulties in obtaining such uniform distribution of the gas flow as mentioned above for the gas that enters the cooler if not specific design measures are taken in order to promote such uniform distribution.

A certain type of pipe bend sometimes referred to as a NACA (National Advisory Council for Aeronautics) design is sometimes used to improve the flow distribution when available space is limited and hence the radius of curvature becomes very small compared to the size of the pipe itself. However, as the space available in modern internal combustion engines is becoming more restricted than ever, also this design has been found to be somewhat too space-requiring. Accordingly, an even more slim design of a pipe bend that promotes uniform flow of gas shortly downstream a substantial change of direction of the gas flow direction in any kind of gas-conduction system, and in particular an exhaust gas system of an internal combustion engine, is sought for.

It is desirable to present a gas flow unit design that enables a substantial change of direction of a gas flow and a uniform flow distribution of the gas across a cross section of an outlet through which the gas is emitted from said gas flow unit within a distance as short as possible downstream of the point of change of flow direction. The design shall be such that it is not space-requiring, and thereby suitable for use as a component in the design of an internal combustion engine for the vehicle industry, where the demands regarding space-saving are high.

In particular, the gas flow unit shall be of such design that it is suitable for use in connection to a gas treatment element such as a cooler or silencer device arranged at a very short distance downstream of the gas flow unit and requiring a uniform flow of gas over its cross section in order to enable an optimum performance thereof.

According to an aspect of the present invention, a gas flow unit is characterised in that, in the first gas flow direction, the gas flow chamber extends beyond a projection of an outer periphery of the gas flow outlet and defines a prolongation configured for conveying a first part of the gas flow such that it enters the gas flow outlet from a different direction than a second part of the gas flow entering the gas flow outlet without passing through said prolongation. Preferably, the distance that the prolongation extends beyond a centre line of the outlet corresponds to 0.7-2.0 times the diameter of the outlet (which preferably has a circular cross section), even more preferably 1.0-1.3 times the diameter of the outlet.

Preferably said prolongation forms a rounded end portion of the gas flow chamber. The rounded shape promotes a smooth redirection of the gas flow direction in said prolongation. Preferably there is provided a means for preventing the upcoming of swirl in the outlet. Swirl is a phenomenon that can be caused by an uneven flow of gas from the gas flow inlet into the chamber and that is detrimental to a uniform flow distribution in the gas flow outlet. Said means may be a dividing wall extending up from the bottom of the prolongation. Preferably said wall extends in a plane which coincides with a centre plane of the outlet. Preferably, said dividing wall divides said first part of the gas flow into two sub-parts on either side of the wall, which meet each other when they leave the wall and enter the gas flow outlet.

According to a preferred embodiment, said prolongation has a volume and geometry such that the amount of said first part of the gas flow is in the range of 10-50%, preferably 30-50% of the amount of said second part of the gas flow. Such an amount of the first part of the gas flow provides for a more uniform flow distribution over the cross section of the outlet.

According to one embodiment, said prolongation has the shape of a part of a sphere, and preferably the shape of a semi-sphere. In such an embodiment, it is preferred that there is provided a dividing wall in the bottom of the prolongation for the purpose of preventing swirl in the gas flow. Preferably, said dividing wall is positioned such that it extends in a plane parallel to the first gas flow direction and is positioned in the middle of the semi-sphere such that it divides the latter in two halves. Preferably the extension plane of the dividing wall is the same as a plane that divides the gas flow outlet in two equal halves.

According to another embodiment, said prolongation has the shape of two part spheres and there is provided a dividing wall between said part spheres. Also here, the dividing wall preferably extends in a plane parallel to the first gas flow direction, wherein said plane preferably coincides with a plane that divides the outlet in two equal halves. However, here, the dividing wall need not be a separate wall arranged at the bottom of the prolongation, but may be a wall that results from the geometry of the two adjacent part spheres, preferably semi-spheres, and the material that separates the latter from each other.

According to one embodiment, said gas flow chamber is delimited by parallel opposite lateral walls and a curved bottom wall, such that the prolongation has the shape of a part of a cylinder. In other words, the prolongation will have a nearly U-shaped cross section, as seen in the direction of the gas flow outlet. Also in this case it is preferred to arrange a dividing wall at the bottom of the prolongation, in order to prevent swirl, and preferably in accordance with the principles described above for the single half-sphere design.

According to yet another embodiment, the gas flow chamber is delimited by parallel opposite lateral walls, a curved bottom wall and an intermediate wall which is parallel with said lateral walls, such that the prolongation has the shape of two parallel parts of a cylinder, preferably two parallel half-cylinders. In other words, the prolongation will, according to this embodiment, have a nearly UU-shaped cross section as seen in the direction of the gas flow outlet. The intermediate wall, formed by adjacent walls that delimit the respective part of cylinder, thus forms a dividing wall, preferably in accordance with the principles already mentioned for the double-half-sphere embodiment.

Preferably, the gas flow inlet and the gas flow outlet are configured such that the second gas flow direction is angular within the range of 45°-135° in relation to the first gas flow direction, preferably in the range of 60°-120°, and more preferably in the range of 85°-95°. The smaller the angle, the less redirecting of the gas flow and hence the less problem with non-uniform flow in the gas flow outlet. Larger angles than the upper limit mentioned here will not be of interest from an overall design point of view and will also further complicate the flow conditions, and are therefore not taken into further consideration here.

Preferably, the gas flow inlet comprises at least one inlet channel which extends in said first gas flow direction in a region in which it enters the gas flow chamber, and the gas flow outlet comprises an outlet channel that extends in said second gas flow direction in a region in which it exits from the gas flow chamber. Accordingly, the at least one inlet channel has a centre line which is angular within the range of 45°-135° in relation to a centre line of the outlet channel, preferably in the range of 60°-120°, and more preferably in the range of 85°-95°. The prolongation of the chamber is in the direction of an extension of the centreline of the at least one inlet channel beyond the outlet (i.e. the outlet opening in the wall that defines said chamber). The inlet channel is to a high degree responsible for the characteristics of the gas flow into the chamber. According to one embodiment of the invention the ratio between the total inlet channel cross section area and the outlet channel cross sectional area is in the range of 0.3-3, resulting in either a somewhat diffusing flow in the outlet channel (low ratio value) or to an accelerating flow (high ratio). In typical applications for which the present design is suitable, the gas pressure and the cross sectional areas of the channels involved are such that the flow is generally incompressible, i.e. flow Mach value is below 0.30. Preferably, the flow rate in the inlet channel is in the range of 30-120 m/s.

Preferably, and as a consequence of the design heretofore described, the gas flow chamber is configured such that the second part of the gas flow enters the gas flow outlet in a portion of the gas flow outlet closer to the gas flow inlet than a portion of the gas flow outlet receiving the first part of the gas flow.

According to a preferred embodiment the gas flow chamber is substantially wider than a projection of an outer periphery of the gas flow outlet in a direction perpendicular to the first gas flow direction and according to one embodiment about two times wider. In other words, the gas flow chamber is substantially wider than a projection of an outer periphery of the gas flow outlet perpendicular to a direction of a centre line of the outlet (or more precisely the outlet channel). On the other hand, the depth of the chamber perpendicular to said width, as seen in direction of a centre line of the outlet (or more precisely the outlet channel), is substantially smaller than the width of the gas flow chamber, and according to one embodiment about half of said width. Preferably, the depth of the chamber as seen in direction of a centre line of the outlet (or more precisely the outlet channel) substantially corresponds to the width of the inlet (or more precisely the inlet channel thereof—Thereby, the chamber does not require much space in the direction of the outlet, which is important in cases where there is not much room for the gas flow unit in that direction. The width of the chamber is larger than the depth thereof, and the increased width contributes to reduce pressure drop in the chamber and to prevent swirl in the outlet. Preferably, the ratio between the width of the chamber and the diameter of the outlet (chamber width/outlet diameter) is in the range of 1.3-2.1. Preferably, the ratio between the length of the chamber, i.e. the length from the inlet to the bottom end of the prolongation, and the diameter of the outlet (chamber length/outlet diameter) is in the range of 1.7-3.5.

Preferably, the gas flow chamber comprises a substantially flat wall positioned opposite the gas flow outlet. Thereby, space is saved in the longitudinal direction of the gas flow outlet.

Preferably, the gas flow chamber has a continuously increasing width in a direction from the inlet to an intermediate portion of the gas flow chamber, wherein the outlet at least partly extends from the intermediate portion. The prolongation is positioned opposite the inlet with regard to the intermediate portion. Preferably, the lateral walls of the gas flow chamber have a curvature matching the curvature of the outlet boundaries in the region with increasing width. Said intermediate portion of the gas flow chamber has an elongated cross sectional shape with a longer extension in a direction of the width and a shorter extension in a direction of the depth. Said intermediate portion of the gas flow chamber has a substantially constant cross section. Further, said intermediate portion of the gas flow chamber comprises said flat wall positioned opposite the gas flow outlet. The gas flow unit is preferably symmetrical with regard to a common centre plane of the inlet and the outlet.

According to an aspect of the invention, the gas flow chamber is configured for conveying said first part of the gas flow and said second part of the gas flow such that they meet in the gas flow outlet and achieve a substantially uniform flow distribution in said second gas flow direction.

The invention, according to an aspect thereof, also refers to a gas treatment device comprising a gas flow unit according to the invention and a gas treatment element positioned downstream of the gas flow outlet.

According to one embodiment, the gas treatment element is a gas cooler element. The cooler element typically comprises a circuit of cooling liquid and heat exchanger surfaces which are to be hit by the incoming gas received from the gas flow unit and to which heat from the gas is transferred to the cooling liquid, which is provided on opposite sides of such surfaces, all in accordance with established cooler technology. As seen in the direction of a centre line of the outlet of the gas flow unit, i.e. in the main flow direction of the gas exiting from the chamber through the outlet, the cooler element has a larger cross section than the outlet. Typically, the cooler comprises a plurality of openings across the cross section thereof through which the gas is to flow. In order to make the cooler element operate efficient, the gas flow entering the cooler element through the outlet of the flow unit shall be as uniform as possible over the cross section thereof.

According to an alternative embodiment, the gas treatment element is a silencer device. According to yet another alternative, the gas treatment element is a compressor of a turbo device.

The invention, according to an aspect thereof, also relates to an internal combustion engine comprising a combustion chamber from which exhaust gas is emitted, characterised in that it comprises a gas treatment device according to the invention for the treatment of exhaust gas emitted from the combustion chamber or inlet air to said combustion chamber.

Preferably, said combustion engine comprises an exhaust gas recycling circuit in which said gas treatment device is arranged, and the gas treatment element forms a cooler for recycled exhaust gas in said exhaust gas recycling circuit.

According to another embodiment, said combustion engine comprises a silencer device through which said exhaust gas is conducted, wherein said gas treatment device forms a part of said silencer device.

Further features and advantages of the present invention will be presented in the following detailed description of embodiments of the invention.

BRIEF DESCRIPTION OF THE DRAWINGS

Hereinafter, by way of example, the invention will be described more in detail with reference to the annexed drawing, on which.

DETAILED DESCRIPTION

Figure 1A:
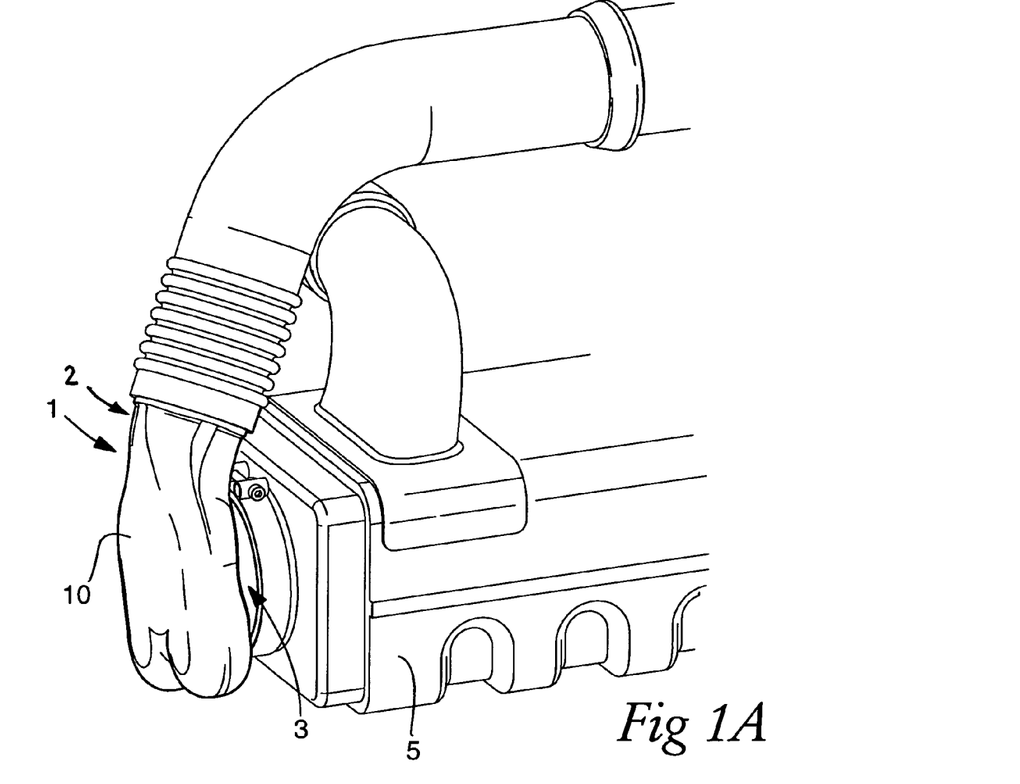
FIG. 1A is a perspective view of a gas flow unit according to the invention connected to a gas treatment element.
Figure 1B:
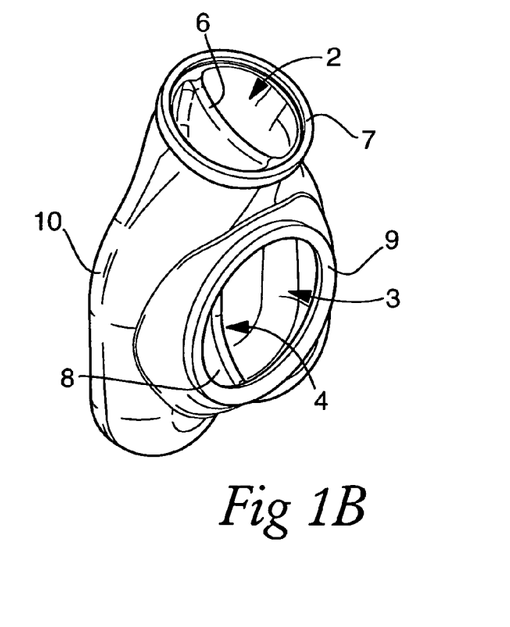
FIG. 1B is a perspective view from another direction of the gas flow unit shown in FIG. 1A.
Figure 1C:
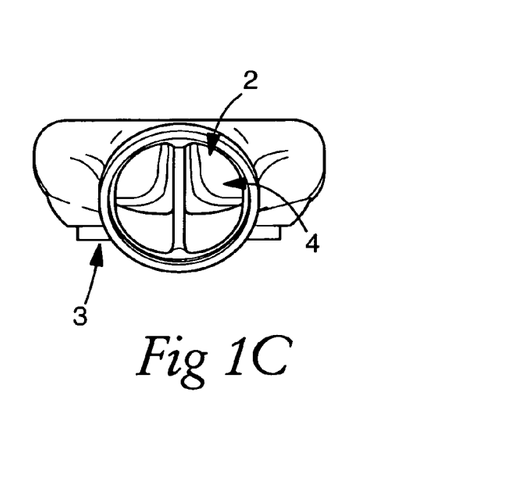
FIG. 1C is a view from above of the gas flow unit shown in FIG. 1B.
Figure 1D:
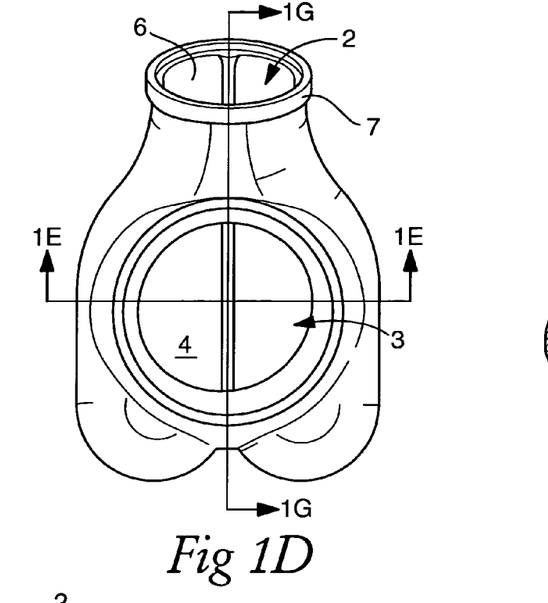
FIG. 1D is a front view of the gas flow unit shown in FIGS. 1A-1C.

FIGS. 1A-1H show a gas flow unit 1 comprising a gas flow inlet 2, a gas flow outlet 3 and a gas flow chamber 4 configured to convey a gas flow from the inlet 2 to the outlet 3. Downstream of the outlet 3, as seen in an assumed flow direction, and connected thereto, there is provided a treatment device 5 for the treatment of a gas flowing through the gas flow unit 1 in a direction from said inlet 2 to said outlet 3. In FIG. 1A, the gas treatment element 5 is a cooler element. However, as will be seen later, other types of gas treatment elements are also conceivable.

The inlet 2 comprises at least one inlet channel 6 delimited by the inner periphery of a tubular inlet wall 7. In a corresponding way, the outlet 3 comprises an outlet channel 8 delimited by the inner periphery of a tubular outlet wall 9. The chamber 4 is delimited by an inner periphery of a chamber wall 10. The inlet 2 and the outlet 3 form openings in the chamber wall 10. The outlet 3 has a substantially circular cross sectional shape (compared to, for example, annular cross sections)

The unit formed by the inlet wall 7, the outlet wall 9 and the chamber wall 10 may, according to one embodiment, be a solitary element (a one-piece unit) formed by means of moulding. Typically, it is made of a metal alloy as its main constituent, but it may also, as an alternative be made of a polymer, or any other suitable material depending on the application.

Figure 1E:
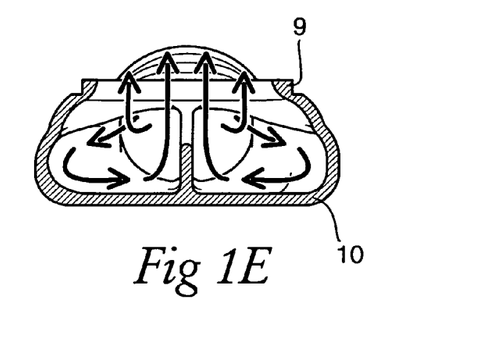
FIG. 1E is a cross section according to E-E in FIG. 1D.
Figures 1F, 1G:
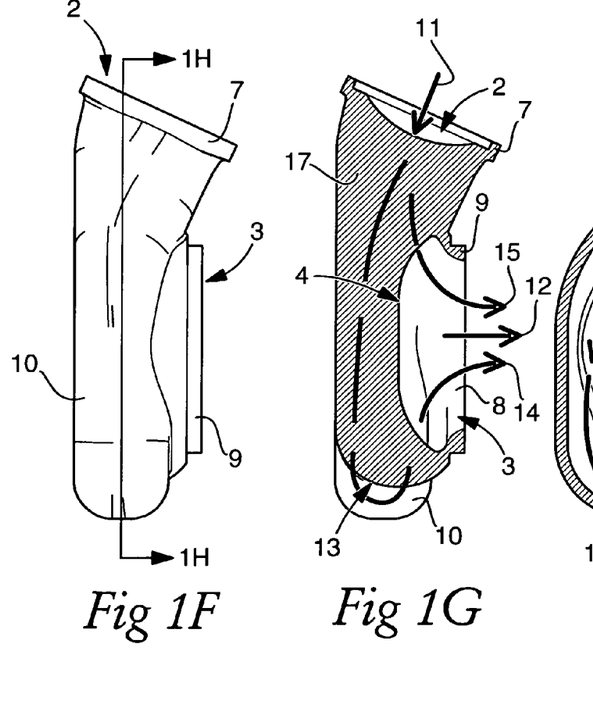
FIG. 1F is a side view of the gas flow unit shown in FIGS. 1A-1E.
FIG. 1G is a cross section according to G-G in FIG. 1D.

With reference to FIG. 1G, in which approximate gas flow directions are indicated with arrows, it can be seen that the gas flow inlet 2 is configured to convey the gas flow in a first direction 11 into the gas flow chamber 4, and the gas flow outlet 3 is configured to convey the gas flow in a second direction 12 from the gas flow chamber, wherein the second direction is almost perpendicular in relation to the first direction. The first direction generally corresponds to the direction of a centre line of the inlet channel 6, and the second direction generally corresponds to the direction of a centre line in the outlet channel 8. Accordingly, the centre lines of the inlet channel 6 and the outlet channel 8 are angular to each other, preferably approximately perpendicular to each other. Preferably, as in this embodiment, the inlet channel 6 is, at least in a region close to the chamber, generally straight, i.e. it does not follow a substantially bent or curved line, and the gas flow through it is assumed to have a generally uniform flow direction in the direction of the centre line (i.e. the longitudinal axis) of the inlet channel 6. Likewise the outlet channel 8 is a straight channel, though preferably a very short channel, and when the gas flows through said outlet 3 it has a generally uniform flow direction in the direction of the centre line of said outlet channel 8. It is inside the chamber 4 that the flow direction of the gas is changed.

As can be seen, the inlet 2 according to this embodiment comprises one single inlet channel 6. However, there may be embodiments in which at least two inlet channels are comprised in the inlet. Such embodiments will be described later.

In the first gas flow direction 11 (see FIGS. 1G and 1H), the gas flow chamber 4 extends beyond a projection of an outer periphery of the gas flow outlet 3 and defines a prolongation 13 configured for conveying a first part 14 of the gas flow such that it enters the gas flow outlet 3 from a different direction than a second part 15 of the gas flow entering the gas flow outlet 3 without passing through said prolongation 13.

Figure 1H:
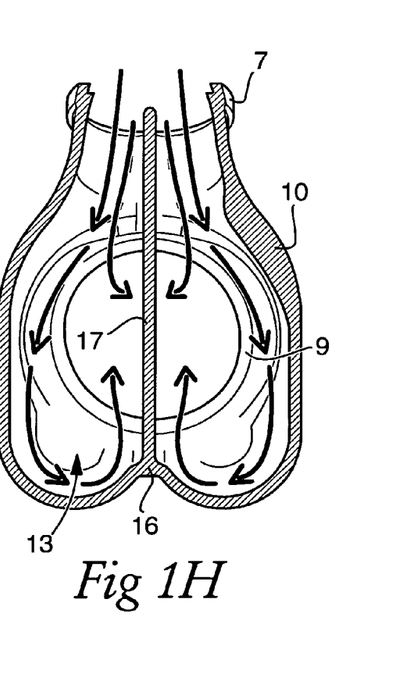
FIG. 1H is a cross section according to H-H in FIG. 1F.

The chamber 4 has a length in the first flow direction 11 (i.e. generally the direction of the centre line of the inlet channel 6) that is larger than the cross section of the outlet 3. It is delimited by front portion of the chamber wall 10, in which the outlet 3 is provided, and an opposite rear portion of the chamber wall 10. The inner surface of said rear portion is generally flat. In other words, the flow chamber 4 comprises a substantially flat wall positioned opposite the gas flow outlet 3.

The depth of the chamber 4. i.e. its extension in a direction from the outlet 3 to the opposite inner surface of the rear portion of the chamber wall 10, substantially corresponds to the width of the inlet 2, or more precisely the width of the inlet channel 6 thereof. The depth of the chamber 4 is predominantly delimited with regard to the general wish to minimize the extension of the gas flow unit in that direction.

The width of the chamber 4 is considerably larger than the depth thereof, and is thus considerably larger than the corresponding width of the inlet 2. The width of the chamber 4 is also considerably larger than the width of the outlet 3 (and the width of the outlet channel 8). The enlarged width of the chamber 4 contributes to reduce the pressure drop of the chamber 4 and to prevent swirl in the outlet 3. In FIG. 1E there is indicated with arrows how the gas is assumed to flow due to the design with regard to the width of the chamber 4.

The above-mentioned prolongation 13 of the chamber may have different designs, one of which is shown in FIG. 1. In the embodiment of FIG. 1 the prolongation 13 forms a rounded end portion of the chamber 4. It has a volume and geometry such that the amount of said first part 14 of the gas flow is in the range of 10-50% of the amount of said second part 15 of the gas flow. More precisely, the prolongation 13 has the shape of two parallel half spheres, a shape that has proven to be advantageous for the purpose of the invention. To a certain extent the two half-spheres are divided from each other at the bottom thereof by a part 16 of the inner periphery of chamber wall 10 that projects up between the half-spheres and defines the shape of the respective half-sphere, thereby forming a dividing wall between the two half-spheres of the prolongation 13. However, there is also provided an intermediate wall 17 in the chamber 4, which wall 17 is connected to the bottom of the prolongation, here defined by the dividing wall 16, and extends into the rest of the chamber 4 all the way to the region of the inlet 2. This intermediate wall 17 is arranged for the purpose of avoiding swirl in the outlet 3. The inlet 2 and the outlet 3 have a common centre plane. The intermediate wall 17 extends in the common centre plane of the inlet 2 and the outlet 3. Thereby, it divides the gas flow from the inlet 2 in two laterally parallel flows, as can bee seen in FIG. 1H. In an upper part of the chamber 4, as well as in the prolongation 13, the intermediate wall 17 extends through the full depth of the chamber 4, i.e. from the front wall to the flat rear wall of the chamber wall 10. In a region in front of the outlet 3, the intermediate wall 17 is retracted such that there is an open space in the chamber which is not divided by said intermediate wall 17 where gas flowing from the different sides of the wall towards the outlet 3 can meet and mix before exiting through the outlet 3. The intermediate wall 17 is in contact with the rear portion of the chamber wall 10 all the way from the region of the inlet 2 to the region of the prolongation 13.

Figure 2A:
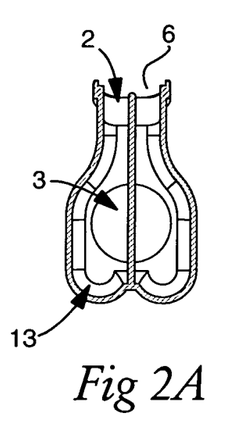
FIG. 2A-2F are cross sections of alternative embodiments of the gas flow unit according to the invention.

FIGS. 2A-2F show different embodiments that may be used and have been considered in accordance with the teaching of the present invention. FIG. 2A corresponds to the already disclosed embodiment in which the inlet 2 comprises one inlet channel and the prolongation 13 comprises two parallel half-spheres, and in which the prolongation 13 as well as the chamber 4 is divided by an intermediate wall 17.

Figure 2B:
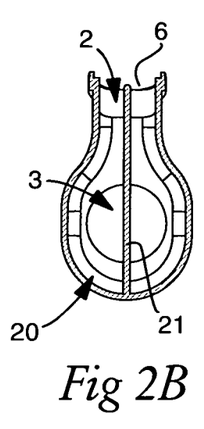

In FIG. 2B there is still one inlet channel 6, but the prolongation, here indicated with 20, is formed by one single half-sphere, and the intermediate wall 21 extends to the bottom thereof. Apart from the different shape of the prolongation 20, the embodiment of FIG. 2B preferably presents the features disclosed above for the embodiment according to FIG. 1A-1H.

Figure 2C:
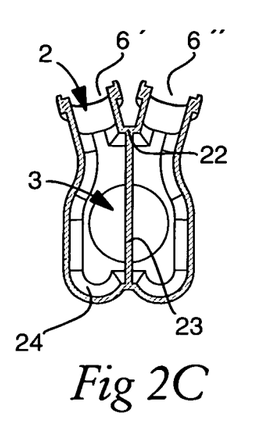

In FIG. 2C the inlet 2 comprises two inlet channels 6', 6", which, preferably, are symmetrically provided on either side of a common centre plane of the inlet 2 and the outlet 3. From the region of a dividing wall 22 between the inlet channels 6', 6" an intermediate wall 23, corresponding to the intermediate wall 17 previously described, extends to the prolongation, which is here indicated with 24 but is identical with the prolongation 13 already described with reference to FIG. 1. Apart from presence of two inlet channels 6', 6" instead of one, the embodiment of FIG. 2C preferably presents the features disclosed above for the embodiment according to FIG. 1A-1H.

Figure 2D:
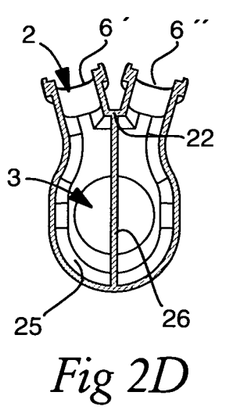

The embodiment in FIG. 2D differs from that in FIG. 2C in that the prolongation 25 has the shape of a half-sphere and that the intermediate wall 26 extends to the bottom of said half-sphere (instead of to a dividing wall like the dividing wall 16 in FIG. 1H).

Figure 2E:
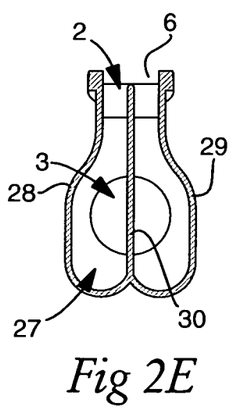

FIG. 2E shows an embodiment in which the gas flow chamber 4 is delimited by parallel opposite lateral walls 28, 29, a curved bottom wall and an intermediate wall 30 which is parallel with said lateral walls 28, 29, such that the prolongation 27 has the shape of two parallel parts of a cylinder, here two half cylinders. Apart from the different shape of the prolongation 27, the embodiment of FIG. 2E preferably presents the further features disclosed above for the embodiment according to FIG. 1A-1H.

Figure 2F:
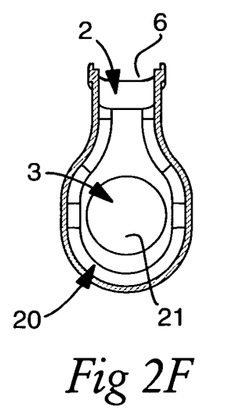

FIG. 2F shows an alternative embodiment according to which there is not provided any intermediate wall. The prolongation of the chamber corresponds to that shown in FIG. 2B, but could be any one within the claimed scope of the invention, such as any one of the other prolongations shown in FIGS. 2A-2E. It should thus be noted that also such solutions without intermediate wall are conceived and possible within the initially claimed scope of the invention. In case the length of a straight inlet channel is sufficient to generate a very uniform flow, for example in the order of 5-10 times the diameter of the inlet channel, solutions without an intermediate wall may be conceived. Apart from the absence of an intermediate wall and the different shape of the prolongation thereof, the embodiment of FIG. 2F preferably presents the further features disclosed above for the embodiment according to FIG. 1 A-1H. It should also be mentioned that further solutions, in which an intermediate wall, like the ones described previously, may be provided only in the region of the outlet and/or the region of the prolongation, and not extending through a region of the chamber between said inlet and prolongation regions are also feasible.

Figure 3:
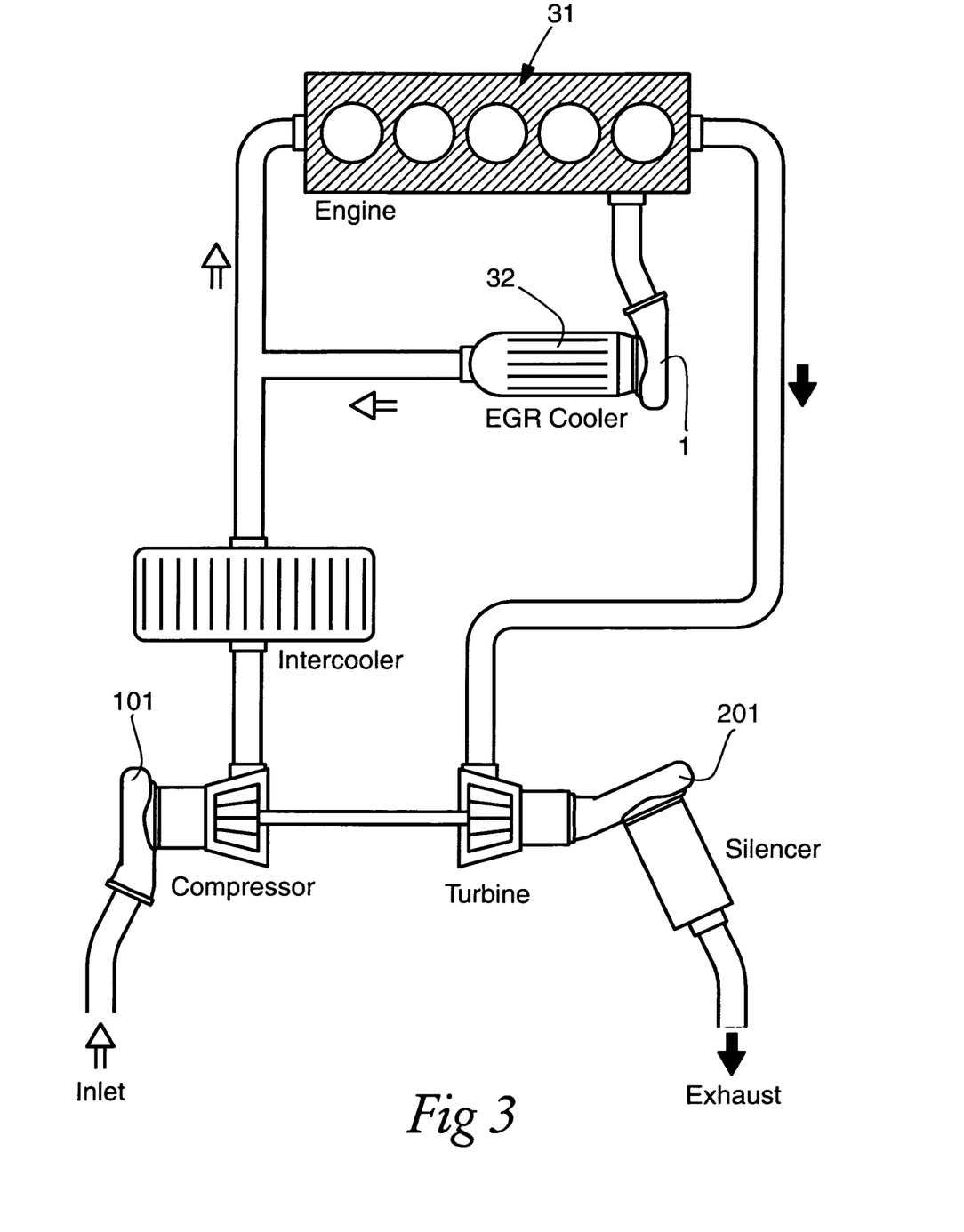
FIG. 3 is a schematic representation of an internal combustion engine, in which there is indicated positions in which a gas flow unit according to the invention may be positioned.

FIG. 3 is a schematic representation of an internal combustion engine 31, showing different preferred applications for a gas flow unit according to the invention.

According to the invention, the gas flow unit forms part of a gas treatment device comprising said gas flow unit and a gas treatment element positioned downstream of the gas flow outlet. According to a main aspect of the invention, the combustion engine comprises an exhaust gas recycling circuit in which said gas treatment device is arranged and the gas treatment element forms a cooler 32 for recycled exhaust gas in said exhaust gas recycling circuit. In FIG. 3 the cooler element is indicated with "EGR cooler", and a gas flow unit 1 according to the invention is connected thereto.

FIG. 3 also shows other applications. Accordingly, an embodiment in which a gas flow unit 201 is connected to a gas treatment element formed by a silencer is indicated in FIG. 3, as well as an embodiment in which a flow unit 101 according to the invention is connected to a turbo compressor. The flow units 1, 101 and 201 may be identical or may be adapted to their respective applications and the specific conditions to be expected there, such as gas temperature, pressure and flow velocity.

The invention claimed is:

1. A gas flow unit comprising
a gas flow inlet,
a gas flow outlet and
a gas flow chamber configured to convey a gas flow from the gas flow inlet to the gas flow outlet, wherein the gas flow inlet is configured to convey the gas flow in a first direction into the gas flow chamber and wherein the gas flow outlet is configured to convey the gas flow in a second direction from the gas flow chamber, wherein the second direction is angular in relation to the first direction, and wherein the gas flow inlet is an inlet into the gas flow chamber and the gas flow outlet is an outlet from the gas flow chamber,
wherein, in the first gas flow direction, the gas flow chamber extends beyond a projection of an outer periphery of the gas flow outlet and defines a prolongation configured for conveying a first part of the gas flow such that it enters the gas flow outlet from a different direction than a second part of the gas flow entering the gas flow outlet without passing through the prolongation, wherein the prolongation has a shape of two part spheres and that there is provided a dividing wall between the part spheres.

2. A gas flow unit according to claim 1, wherein the prolongation forms a rounded end portion of the gas flow chamber.

3. A gas flow unit according to claim 1, wherein the prolongation has a volume and a geometry such that an amount of the first pan of the gas flow is in a range of 10-50% of an amount of the second part of the gas flow.

4. A gas flow unit according to claim 1, wherein the prolongation has a shape of a part of a sphere.

5. A as flow unit according to claim 4, wherein the prolongation has a shape of a semi-sphere.

6. A gas flow unit according to claim 1, wherein the gas flow chamber is delimited by parallel opposite lateral walls and a curved bottom wall, such that the prolongation has a shape of a part of a cylinder.

7. A as flow unit according to claim 1, wherein the gas flow inlet and the gas flow outlet are configured such that the second direction is angular within a range of 45°-135° in relation to the first direction.

8. A gas flow unit according to claim 1, wherein the gas flow inlet comprises an inlet channel which extends in the first direction in a region in which it enters the gas flow chamber, and that the gas flow outlet comprises an outlet channel that extends in the second direction in a region in which it exits from the gas flow chamber.

9. A gas flow unit according to claim 1, wherein the gas flow outlet has a substantially circular cross sectional shape.

10. A gas flow unit according to claim 1, wherein the gas flow chamber is configured such that the second part of the gas flow enters the gas flow outlet in a portion of the gas flow outlet closer the gas flow inlet than a portion of the gas flow outlet receiving the first part of the gas flow.

11. A gas flow unit according to claim 1, wherein the has flow chamber is substantially wider than a projection of an outer periphery of the gas flow outlet in a direction perpendicular to the first gas flow direction.

12. A gas flow unit according to claim 1, wherein the gas flow chamber comprises as substantially flat wall positioned opposite the gas flow outlet.

13. A gas flow unit according, to claim 1, wherein the gas flow chamber is configured for conveying the first part of the gas flow and the second part of the gas flow such that they meet in the gas flow outlet and achieve a substantially uniform flow distribution in the second gas flow direction.

14. A gas treatment device comprising
a gas flow unit according, to claim 1, and
a gas treatment element positioned downstream of the gas flow outlet.

15. A gas treatment device according to claim 14, wherein the gas treatment element is a gas cooler element.

16. A gas treatment device according to claim 14, wherein the gas treatment element is a silencer device.

17. An internal combustion engine comprising a combustion chamber, from which exhaust gas is emitted, wherein the engine comprises a gas treatment device according to claim 14 for the treatment of exhaust gas emitted from the combustion chamber or inlet air to the combustion chamber.

18. An internal combustion engine according to claim 17, wherein the engine comprises an exhaust gas recycling circuit in which the gas treatment device is arranged and the gas treatment element forms a cooler for recycled exhaust was in the exhaust gas recycling circuit.

19. An internal combustion engine according to claim 17, wherein the engine comprises a silencer device through which the exhaust gas is conducted and that the gas treatment device forms a part of the silencer device.

20. A gas flow unit comprising
a gas flow inlet,
a gas flow outlet and
a gas flow chamber configured to convey a gas flow from the gas flow inlet to the gas flow outlet, wherein the gas flow inlet is configured to convey the gas flow in a first direction into the gas flow chamber and wherein the gas flow outlet is configured to convey the gas flow in a second direction from the gas flow chamber, wherein the second direction is angular in relation to the first direction, and wherein the gas flow inlet is an inlet into the gas flow chamber and the gas flow outlet is an outlet from the gas flow chamber,
wherein, in the first gas flow direction, the gas flow chamber extends beyond a projection of an outer periphery of the gas flow outlet and defines a prolongation configured for conveying a first part of the gas flow such that it enters the gas flow outlet from a different direction than a second part of the gas flow entering the gas flow outlet without passing through the prolongation, wherein the gas flow chamber is delimited by parallel opposite lateral walls, a curved bottom wall and an intermediate wall which is parallel with the lateral walls, such that the prolongation has a shape of two parallel parts of a cylinder.

21. A gas flow unit according to claim 20, wherein the prolongation forms a rounded end portion of the gas flow chamber.

22. A gas flow unit according to claim 20, wherein the prolongation has a volume and a geometry such that an amount of the first part of the gas flow is in a range of 10-50% of an amount of the second part of the gas flow.

23. A gas flow unit according to claim 20, wherein the prolongation has a shape of a part of a sphere.

24. A gas flow unit according to claim 23, wherein the prolongation has a shape of a semi-sphere.

25. A gas flow unit according to claim 20, wherein the gas flow chamber is delimited by parallel opposite lateral walls and a curved bottom wall, such that the prolongation has a shape of a part of a cylinder.

26. A gas flow unit according to claim 20, wherein the gas flow inlet and the gas flow outlet are configured such that the second direction is angular within a range of 45-135° in relation to the first direction.

27. A gas flow unit according to claim 20, wherein the gas flow inlet comprises an inlet channel which extends in the first direction in a region in which it enters the gas flow chamber, and that the gas flow outlet comprises an outlet channel that extends in the second direction in a region in which it exits from the gas flow chamber.

28. A gas flow unit according to claim 20, wherein the gas flow outlet has a substantially circular cross sectional shape.

29. A gas flow unit according to claim 20, wherein the gas flow chamber is configured such that the second part of the gas flow enters the gas flow outlet in a portion of the gas flow outlet closer the gas flow inlet than a portion of the gas flow outlet receiving the first part of the gas flow.

30. A gas flow unit according to claim 20, wherein the has flow chamber is substantially wider than a projection of an outer periphery of the gas flow outlet in a direction perpendicular to the first gas flow direction.

31. A gas flow unit according to claim 20, wherein the gas flow chamber comprises a substantially flat wall positioned opposite the gas flow outlet.

32. A gas flow unit according to claim 20, wherein the gas flow chamber is configured for conveying the first part of the gas flow and the second part of the gas flow such that they meet in the gas flow outlet and achieve a substantially uniform flow distribution in the second gas flow direction.

33. A gas treatment device comprising
a gas flow unit according to claim 20, and
a gas treatment element positioned downstream of the gas flow outlet.

34. A gas treatment device according to claim 33, wherein the gas treatment element is a gas cooler element.

35. A gas treatment device according to claim 33, wherein the gas treatment element is a silencer device.

36. An internal combustion engine comprising a combustion chamber, from which exhaust gas is emitted, wherein the engine comprises a gas treatment device according to claim 33 for the treatment of exhaust gas emitted from the combustion chamber or inlet air to the combustion chamber.

37. An internal combustion engine according to claim 36, wherein the engine comprises an exhaust gas recycling circuit in which the gas treatment device is arranged and the gas treatment element forms a cooler for recycled exhaust gas in the exhaust gas recycling circuit.

38. An internal combustion engine according to claim 36, wherein the engine comprises a silencer device through which the exhaust gas is conducted and that the gas treatment device forms a part of the silencer device.

* * * * *